United States Patent

Brouwer et al.

Patent Number: 5,402,822
Date of Patent: Apr. 4, 1995

[54] ANTI-CAVITATION VALVE

[75] Inventors: Douglas J. Brouwer; Clarence E. Klessig, both of Sheboygan, Wis.

[73] Assignee: Kohler Co., Kohler, Wis.

[21] Appl. No.: 154,223

[22] Filed: Nov. 17, 1993

[51] Int. Cl.6 .......................................... F16K 24/02
[52] U.S. Cl. ................................... 137/589; 137/526; 137/625.5
[58] Field of Search ...................... 137/526, 589, 625.5

[56] References Cited

U.S. PATENT DOCUMENTS

| | | | |
|---|---|---|---|
| 245,509 | 8/1881 | Kienzy | 137/589 |
| 1,579,503 | 4/1926 | Bloch | 137/625.5 |
| 1,957,082 | 5/1934 | Schneible | 137/589 |
| 2,949,933 | 8/1960 | Moen | 137/625.17 |
| 3,187,770 | 6/1965 | Plamann | 137/589 |
| 3,236,253 | 2/1966 | Symmons | 137/119 |
| 3,605,132 | 9/1971 | Lineback | 137/526 |
| 4,004,610 | 1/1977 | Theriot | 137/614.17 |
| 4,182,374 | 1/1980 | Spanides | 137/625.48 |
| 4,523,604 | 6/1985 | Hutto | 137/102 |
| 4,628,962 | 12/1986 | Pezzarossi | 137/625.47 |
| 4,862,524 | 9/1989 | Kimak | 4/192 |
| 4,874,006 | 10/1989 | Iqbal | 137/119 |
| 4,899,397 | 2/1990 | Crawford et al. | 4/191 |
| 4,951,702 | 8/1990 | Brotcke | 137/218 |

*Primary Examiner*—Robert G. Nilson
*Attorney, Agent, or Firm*—Quarles & Brady

[57] ABSTRACT

In a shut-off or diverter valve, an anti-cavitation valve located downstream of the shut-off or diverter valve member vents an outlet passageway to the atmosphere to minimize cavitation in an outflowing column of water which has suddenly been isolated from the inlet. The anti-cavitation valve may be located in the interior of the shut-off or diverter valve member. When the pressure gradient between atmospheric pressure and the pressure in the just closed outlet passageway exceeds the force exerted by a spring, the anti-cavitation valve opens an air passageway communicating between the atmosphere and the outlet passageway. Part of the air passageway may be in the interior of the push rod of the diverter valve member.

6 Claims, 6 Drawing Sheets

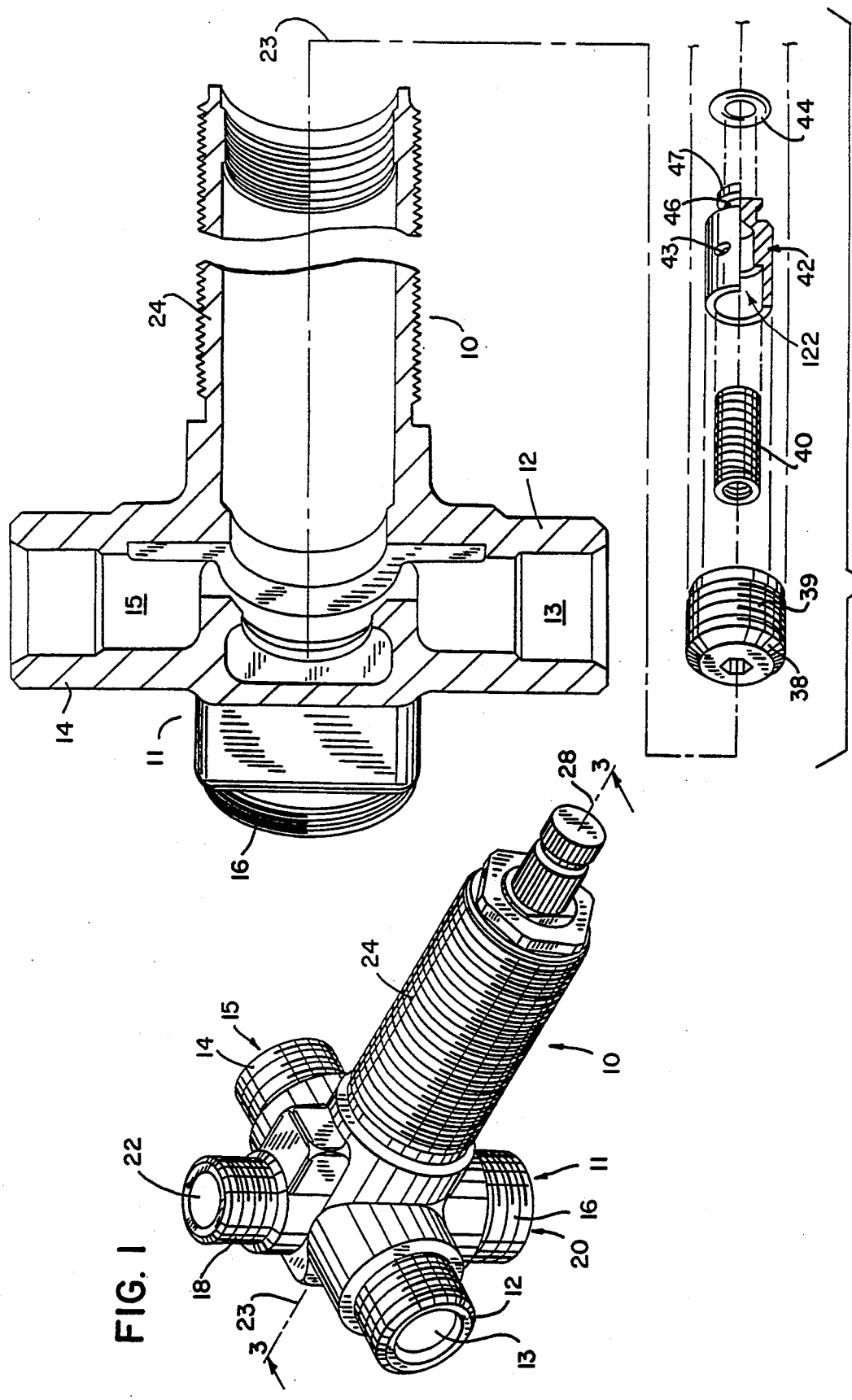

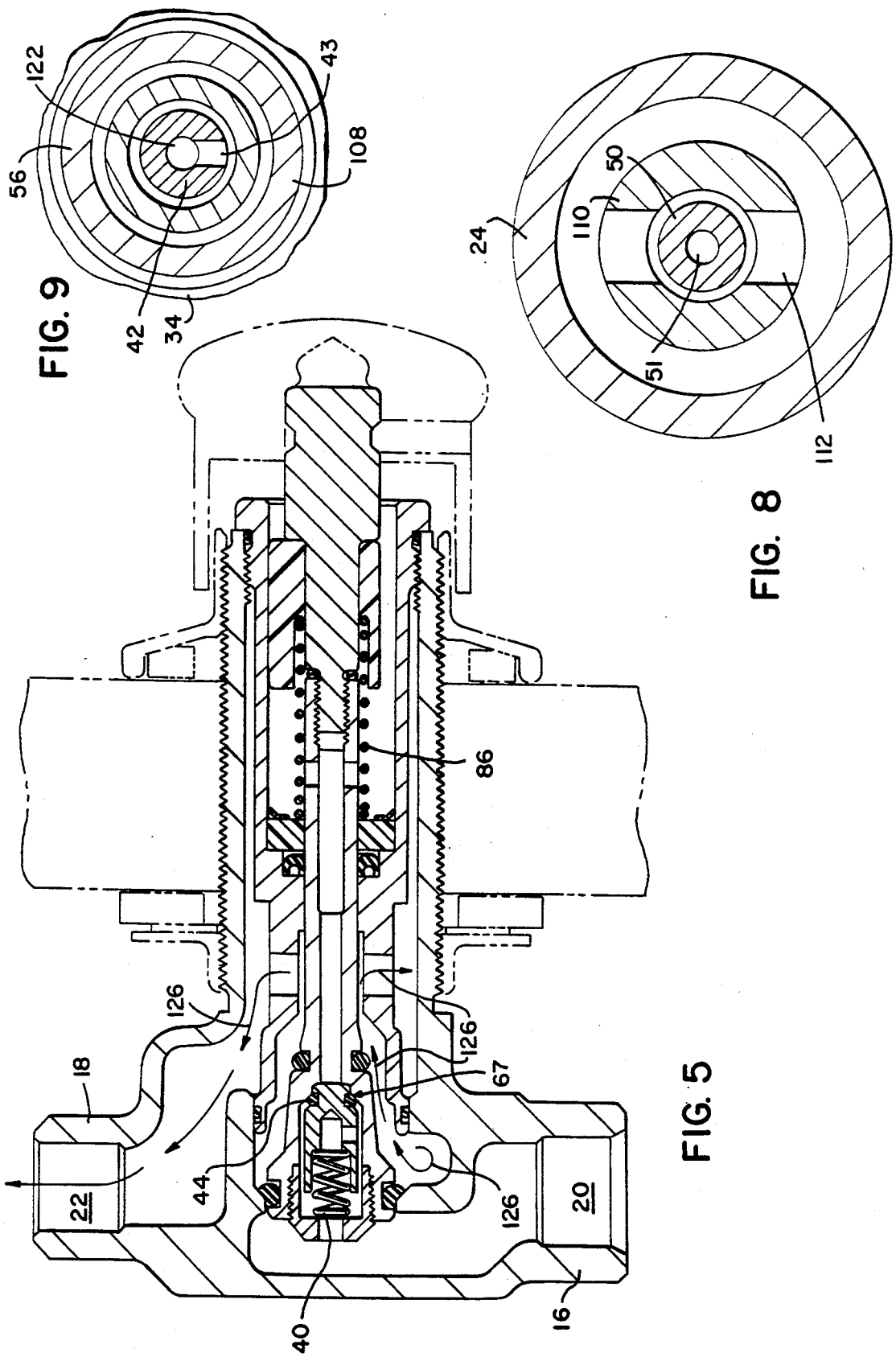

ANTI-CAVITATION VALVE

BACKGROUND OF THE INVENTION

1. Field Of The Invention

This invention relates to a valve which shuts off the flow of a liquid while reducing the noise caused by the shut-off. It appears especially well suited for use in the plumbing field.

2. Description Of The Art

When a valve shuts off the flow of a fluid, a sudden drop of pressure can occur behind the outflowing fluid. Sometimes the reduced pressure is below the vapor pressure of the fluid, thereby creating bubbles in it. As the system rapidly returns to pressure equilibrium, the bubbles collapse. This is known as cavitation and can cause noise and vibration which, in addition to being unpleasant, can damage components and disrupt the proper functioning of the system.

Cavitation is a special problem in diverter valves which receive fluid from one or more intake conduits and selectively direct the flow to one or more of a plurality of output conduits. One such valve is used to enable a bather to direct the water supply through a tub spout or a shower head. In many such diverter valves, one quick stroke of a valve member can almost instantly block a currently flowing outlet and open another. The suddenness of this action causes significant cavitation effects. In some cases the effect is so pronounced that the valve bounces off the desired position so as to defeat the selection.

Another factor complicating efforts to solve this problem is that plumbing codes regulate how air can be let into lines (e.g., in the case of a vacuum breaker). When air is let into a line from an opening below or behind a deck, the risks of water damage due to leakage is greater. Further, codes require accessibility of such structures.

SUMMARY OF THE INVENTION

The invention provides a valve for selectively controlling the flow of a liquid from an inlet to at least one outlet. The valve has a housing which includes an inlet conduit and at least a first outlet conduit. Located in the housing are valve means for controlling liquid communication between the inlet conduit and the first outlet conduit. Anti-cavitation means are provided for opening communication between a portion of the outlet conduit that is downstream and adjacent to the valve means and a source of air when the valve is closed but the pressure in the first outlet conduit adjacent the valve means is below a selected pressure. The anti-cavitation means is juxtaposed and constructed so as to reduce noise in the first outlet conduit due to the closing of the valve means.

In another aspect, the air can be delivered to the first outlet conduit by a pathway that passes through the valve means from the upstream side of the valve means to the downstream side of the valve means.

In a further aspect, the valve has a diverter that can selectively divert the liquid into either said first outlet conduit or a second outlet conduit. The diverter and valve means may be part of a plunger unit which includes two external valve seals, a check valve housed within an end of the unit, and a longitudinal pathway extending from the check valve toward an opposite end of the plunger unit. The plunger unit may be movable within the housing between a first position sealing off liquid flow to the first outlet conduit and a second position sealing off liquid flow to the second outlet conduit.

The objects of the present invention therefore include: (a) providing a valve (and components thereof) to mitigate the unpleasant and damaging effects of cavitation; (b) providing anti-cavitation protection in a diverter valve, and (c) providing a structure for accomplishing these objectives which can meet code requirements concerning accessibility and minimizing leakage damage.

Other objects and advantages of the invention (in addition to those noted above) will be apparent from the description which follows. The preferred embodiments will be described in reference to the accompanying drawings. These embodiments do not represent the full scope of the invention. Rather, the invention may be employed in other embodiments.

BRIEF DESCRIPTION OF THE DRAWINGS

FIG. 1 is a perspective view of a diverter-valve embodiment of the invention;

FIGS. 2a and 2b comprise an exploded, perspective and partially cross-sectional view of the embodiment of FIG. 1;

FIGS. 3–5 are cross-sectional views taken along line 3—3 of FIG. 1 showing the valve in, respectively, a first steady state of allowing the flow in a first outlet (FIG. 3), a transitional state immediately after diverting the flow to a second outlet (FIG. 4), and another steady state (FIG. 5) of allowing flow through the second outlet conduit;

FIG. 6 is a cross-sectional view taken on line 6—6 of FIG. 3;

FIG. 7 is a cross-sectional view taken on line 7—7 of FIG. 3;

FIG. 8 is a cross-sectional view taken on line 8—8 of FIG. 3;

FIG. 9 is a cross-sectional view taken on line 9—9 of FIG. 3; and

DESCRIPTION OF THE PREFERRED EMBODIMENTS

Figure 2B:
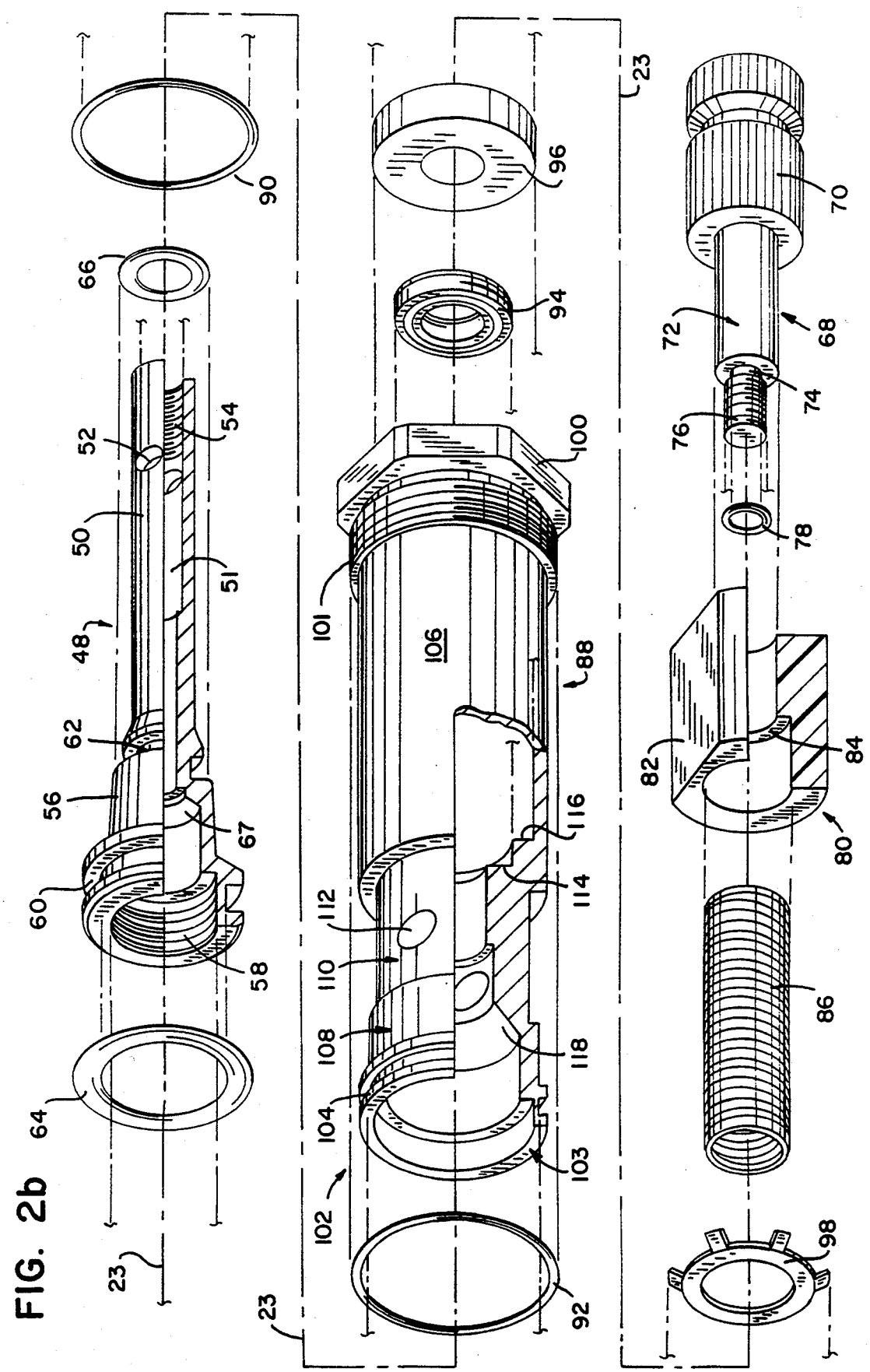

FIG. 1 illustrates a diverter valve housing or body 10 which has a T-shaped base 11 comprising inlet ports 12, 14 (which may, for example, be connected to inlet pipes of hot and cold water) which define inlet conduits 13, 15 and outlet ports 16, 18 which define the first outlet conduit 20 and the second outlet conduit 22 respectively and which may, for example, be connected to outlet pipes leading to a bathtub spout and a showerhead respectively. Formed on the base around longitudinal axis 23 is an elongated, threaded, hollow cylinder, the cartridge housing 24.

The interior of base 11 is formed so that fluid entering the inlet conduits 13, 15 would, in the absence of the valve elements to be discussed later, flow along two paths which will be described primarily with reference to FIG. 10. The first path is through the funnel passageway 26 (which, as defined by seat 27, forms a part of first outlet conduit 20) and out through outlet port 16. This path is illustrated by arrow 28 in FIG. 10. The other path 30 is in the other direction, through the passageway 32 formed in base 11 by the cylindrical wall 34. Path 30 continues through the opening 36 into outlet conduit 22 and out of outlet port 18. The valve assembly to be discussed below moves between a position in which it blocks the funnel passageway 26 and allows access to the opening 36 and a position in which it denies access to opening 36 but opens funnel passageway 26.

The cartridge housing 24 receives a valve assembly consisting of an anti-cavitation valve subassembly, a diverter-plunger subassembly and a cartridge subassembly.

As shown in FIG. 2a, the anti-cavitation valve subassembly consists of a hollow bushing 38 with exterior threads 39; a compression spring 40 inserted into the hollow of bushing 38; a hollow, check-valve plunger 42 positioned over spring 40; and an O-ring 44 inserted on the neck 46 of the check valve plunger 42. The check-valve plunger 42 has lateral hole 43 and closed end 47.

As illustrated in FIG. 2b, the diverter plunger subassembly includes as a major subpart the diverter valve plunger 48, which comprises a hollow, elongated rod 50, one end of which has lateral hole 52 and internal threads 54 and the other end of which has a hollow dome 56 formed on it. Dome 56 has, at its open end, internal threads 58 and an external O-ring groove 60 and, at its end which the adjoins rod 50, a smaller O-ring groove 62. O-rings 64 and 66 are fitted into grooves 60 and 62 respectively. In dome 56 is a seat 67.

A second subpart of the diverter plunger subassembly includes the stem 68, which has at one end a handle mount 70 and at the other end an elongated rod 72 which culminates in an O-ring groove 74 and a threaded mounting shaft 76. O-ring 78 is fitted into O-ring groove 74. Rod 72 is inserted through the hollow interior of a spacer 80, whose exterior is cylindrical except for a truncated flat portion 82 and whose interior is of two diameters, thereby defining a shoulder 84. The spacer 80 abuts the handle mount 70. A cylindrical compression spring is inserted into spacer 80 and abuts the shoulder 84.

Connection of the two subparts of the diverter plunger subassembly will be described after the cartridge subassembly is described.

The cartridge subassembly, also best seen in FIG. 2b, consists of a cartridge 88, O-rings 90, 92, an U-shaped packing seal 94, a washer 96 and a retaining ring 98.

The cartridge 88 is a hollow cylinder of varying external and internal diameters. Externally, there is formed on one end a hexagonal nut 100 and a threaded portion 101 and at the other end a shoulder portion 102 which has an O-ring groove 104. Extending inwardly from the threaded portion 101 is a wide portion 106 and from the shoulder portion 102 a middle-diameter portion 108. Between them is narrow portion 110, which is laterally pierced by a hole 112. The interior of the wide portion 106 narrows in a step arrangement to define a shoulder 114 and a shoulder 116 against which are abutted the U-packing ring 94 and the washer 96 respectively, which are held in place by the retaining ring 98. The interior of the middle diameter portion 108 narrows diagonally to form a seat 118.

Figures 3, 6:
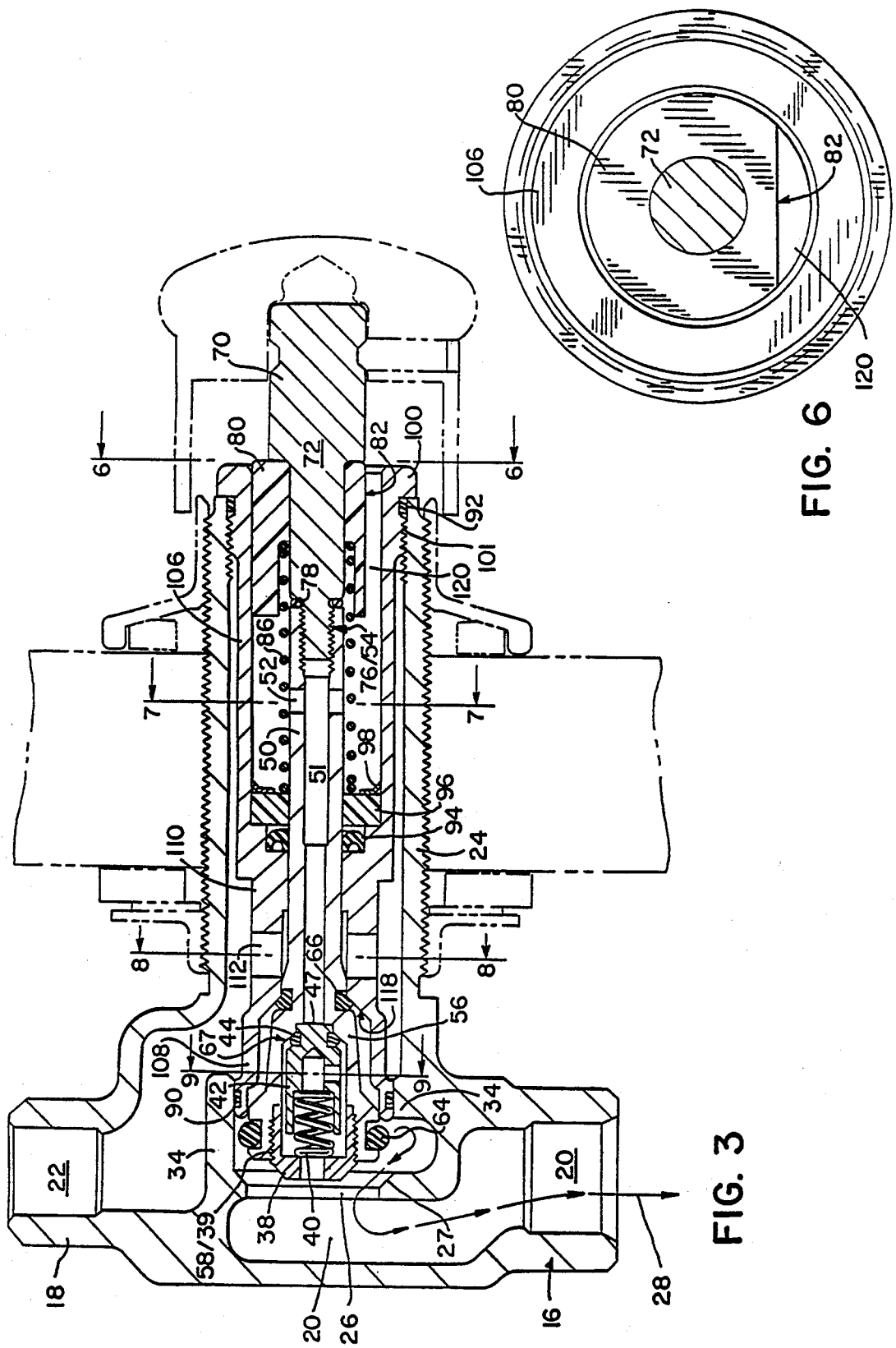

As illustrated in FIGS. 2b and 3, the anti-cavitation valve assembly is attached to the dome 56 of the diverter valve 48 by screwing threads 39 of the anti-cavitation bushing 38 into threads 58 of dome 56 on one end of diverter plunger 48. As a result of the force of spring 40, the closed end 47 of the check valve plunger 42 is driven against the open end of the longitudinal passageway 51 of the rod 50 of the diverter valve plunger 48, and O-ring 44 seals against seat 67. The rod 50 of the diverter plunger subassembly is inserted into the shoulder portion 102 end of the cartridge 88, and the stem 68 is inserted through spacer 82, spring 86 and into the hexagonal nut 100 end of cartridge 88. The diverter valve plunger 48 and the stem 68 are fastened together by means of threads 54 and threads 76. When that has been done, the stem 68/plunger 48 operates as a spring loaded plunger unit which is biased by spring 86 in the direction of stem 68.

Figure 10:
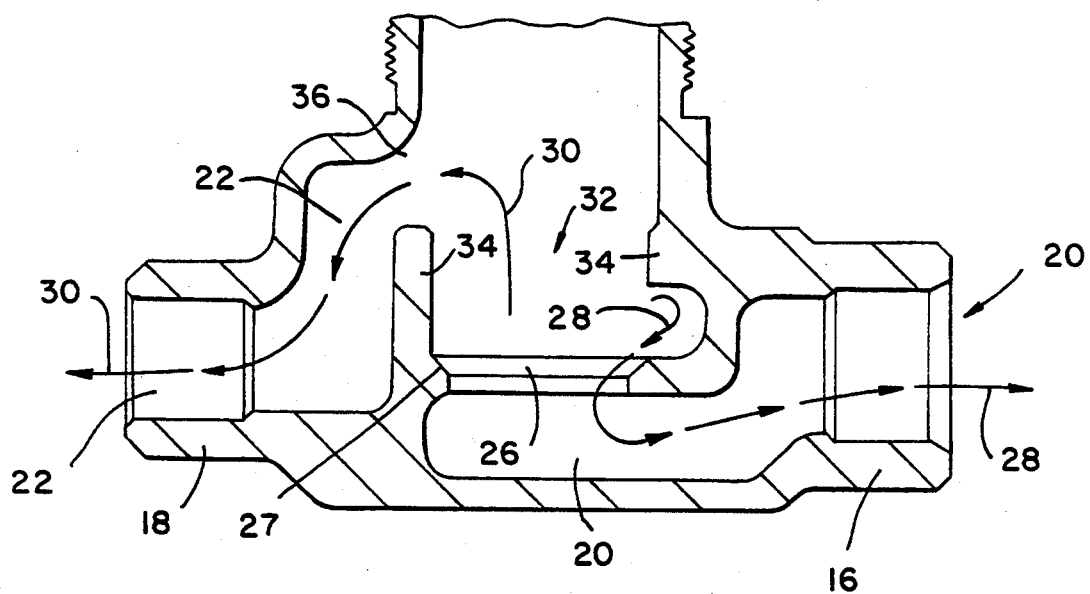
FIG. 10 is a partial cross-sectional view of the valve body taken on line 3—3 of FIG. 1.

The thusly assembled valve assembly is then inserted into the cartridge housing 24 so that, as seen in FIG. 3, the O-ring 90 abuts the cylindrical wall 34 in the base 11 and thereby seals off the passageway 32 and blocks the path 30 shown in FIG. 10. Therefore, fluid can move from the inlet conduits 13, 15 to second outlet conduit 22 only to the extent, as will be described below, a path is created between the interior of the middle-diameter portion 108 of cartridge 88 and the exterior of the dome 56 of diverter valve plunger 48.

As may further be seen in FIG. 3, threads 101 and O-ring 92 seal against the interior of cartridge housing 24 at the handle end. When that has been done, atmospheric pressure communicates with the check-valve plunger 42 through a path consisting of the passageway 120 (defined by the flat surface 82 of spacer 80 and the interior wall of wide portion 106 of cartridge 88), hole 52 of rod 50, and passageway 51 inside of rod 50.

The operation of the anti-cavitation valve will now be described.

Because of the force provided by biaser spring 86, the system is normally in the state shown in FIG. 3. In that state, fluid moving into the inlet conduits 13, 15 follows path 28 as shown in FIGS. 10 and 3. This is possible because the O-ring 64 is not abutted against the seat 27, and therefore the funnel passageway 26 is open. Fluid cannot reach second outlet conduit 22 because the O-ring 66 seals off the seat 118 of the cartridge 88. In a bathtub/shower use, water would flow to the bathtub spout through first outlet conduit 20, and no water would flow to the shower through second outlet conduit 22.

In this state, the fluid in first outlet passageway 20 is under a pressure which is exerted against the interior of the closed end 47 of check valve plunger 42. Atmospheric pressure is exerted on the exterior of the closed end 47 of the check valve plunger 42. Since, in that state, the atmospheric pressure does not exceed the pressure in the outlet passage 20, or exceeds it by less than the force exerted by spring 40, the O-ring 44 of the check valve plunger 42 continues to seal against the seat 67 and therefore prevents atmospheric pressure in the passageway 51 from reaching the first outlet passageway 20.

Figures 4, 7:
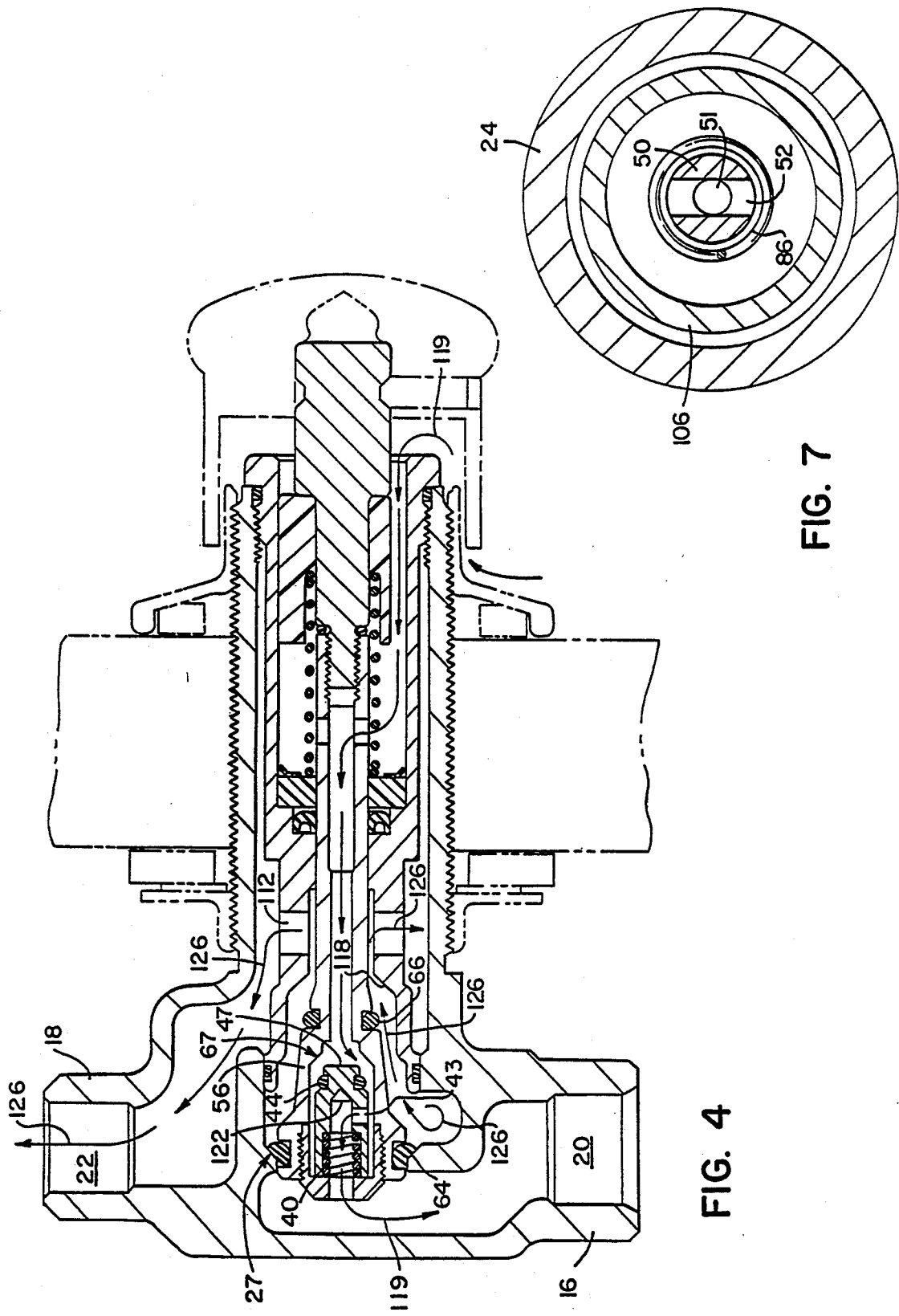

FIG. 4 illustrates a momentary state after stem 68 has been pushed inward. Flow of fluid from the inlet conduits 13, 15 to the first outlet conduit 20 has been stopped because the O-ring 64 seals against the seat 27, thereby closing off funnel passageway 26. Instead, because O-ring 66 has moved away from seat 118, the fluid entering the inlet conduits 13, 15 follows path 126 into the second outlet conduit 22. Path 126 is between the interior of middle diameter portion 108 of the cartridge 88 and the exterior of the dome 56, through hole 112 of narrow portion 110 of cartridge 88 and into second outlet conduit 22.

As soon as first outlet conduit 20 is thus sealed off, the pressure in it, which is exerted against the interior of the closed end 47 of check valve plunger 42, drops because the outflowing fluid creates a partial vacuum. As a result, the atmospheric pressure which is exerted against the exterior of the closed end 47 exceeds the pressure in the first outlet conduit 20 by more than the amount of pressure exerted by the spring 40—i.e., when the pressure in the first outlet conduit adjacent the dome 56 is below a preselected pressure determined by the choice of the spring 40. Therefore, the atmospheric pressure drives the check valve plunger 42, and its O-ring 44, away from seat 67 of the interior of dome 56 of diverter valve plunger 48. This allows communication of atmospheric pressure with first outlet conduit 20 by extending atmospheric pressure path 119 between the check valve plunger 42 and the interior of dome 56, into hole 43 of the check valve plunger 42, through the hollow passageway 122 of check valve plunger 42 and into the first outlet conduit 20. This equalizes the pressure and therefore minimizes the cavitation effects which would otherwise occur.

FIG. 5 illustrates the state when incoming fluid continues to flow along path 126 into second outlet conduit 22 and no fluid reaches first outlet conduit 20, but where the pressure in first outlet conduit 20 has been increased sufficiently so that it and spring 40 have sufficient force to move check valve plunger 42 and its O-ring 44 against seat 67 of the interior of dome 56, thereby terminating communication of atmospheric pressure with first outlet conduit 20. Spring 86 is chosen so that, under normal operating conditions, the pressure of the fluid flowing along path 126 is sufficient to maintain the valve in this state, despite the contrary bias of spring 86, until the user pulls on the stem 68 or water pressure falls below the normal operating level.

While a diverter valve embodiment of the invention has been described, the invention is not so limited. There can be unpleasant and potentially damaging cavitation effects in a non-diverter, shut-off valve when the flow of fluid is abruptly shut off. The invention can be employed in such a valve as well. In addition, the invention can be employed in a diverter valve which also combines the function of mixing hot and cold water as desired by the user, and it could be employed in a diverter valve having only one inlet, or more than two inlets, or a diverter valve having more than two outlets.

It will be recognized that the invention automatically and quickly mitigates unpleasant and/or harmful cavitation effects.

Although the preferred embodiment of the invention has been described above, the invention claimed is not so restricted. There may be various other modifications and changes to this embodiment which are within the scope of the invention.

We claim:

1. A valve for selectively controlling the flow of a liquid from an inlet to at least one outlet, the valve comprising:
   a housing having an inlet conduit and at least a first outlet conduit; and
   valve means in the housing for controlling liquid communication between the inlet conduit and the first outlet conduit;
   anti-cavitation means for automatically controlling communication between (a) a portion of the outlet conduit that is downstream and adjacent to the valve means and (b) a source of air when the valve is in a closed position so that there is communication whenever the pressure in the first outlet conduit adjacent the valve means is below a selected pressure and there is no communication whenever the pressure in the first outlet conduit is not below the selected pressure; and
   wherein the anti-cavitation means is juxtaposed and constructed so as to reduce noise in the first outlet conduit due to the closing of the valve means.

2. The valve of claim 1, wherein the air can be delivered to the first outlet conduit by a pathway that passes through the valve means from the upstream side of the valve means to the downstream side of the valve means.

3. A valve for selectively controlling the flow of a liquid from an inlet to at least one outlet, the valve comprising:
   a housing having an inlet conduit and at least a first outlet conduit; and
   valve means in the housing for controlling liquid communication between the inlet conduit and the first outlet conduit;
   anti-cavitation means for opening communication between (a) a portion of the outlet conduit that is downstream and adjacent to the valve means and (b) a source of air when the valve is closed but the pressure in the first outlet conduit adjacent the valve means is below a selected pressure;
   wherein the anti-cavitation means is juxtaposed and constructed so as to reduce noise in the first outlet conduit due to the closing of the valve means;
   wherein the air can be delivered to the first outlet conduit by a pathway that passes through the valve means from the upstream side of the valve means to the downstream side of the valve means; and
   wherein the valve also has a diverter that can selectively divert the liquid into either said first outlet conduit or a second outlet conduit.

4. The valve of claim 3, wherein the diverter and the valve means are part of a plunger unit, and wherein the plunger unit includes two external valve seals, a check valve housed within an end of the plunger unit, and a longitudinal pathway extending from the check valve toward an opposite end of the plunger unit.

5. The valve of claim 4, wherein the plunger unit can move within the housing between a first position sealing off liquid flow to the first outlet conduit and a second position sealing off liquid flow to the second outlet conduit.

6. A plunger unit for use in a valve for selectively controlling the flow of liquid from an inlet to either of two outlets,
   the valve being of the type which has a diverter that can selectively divert a liquid from an inlet conduit into either a first outlet conduit or a second outlet conduit, the valve being further of the type which has (a) a housing having an inlet conduit and at least a first outlet conduit, (b) valve means in the housing for controlling liquid communication between the inlet conduit and the first outlet conduit, (c) anti-cavitation means for opening communication between a portion of the outlet conduit that is downstream and adjacent to the valve means and a source of air when the valve is closed but the pressure in the first outlet conduit adjacent the valve means is below a selected pressure, (d) wherein the anti-cavitation means is juxtaposed and constructed so as to reduce noise in the first outlet conduit due to the closing of the valve means, (e) wherein the air can be delivered to the first outlet conduit by a pathway that passes through the valve means from the upstream side of the valve means to the downstream side of the valve means, and (f) wherein the diverter and the valve means are part of a plunger unit; the plunger unit comprising:

a plunger, two external valve seals around the plunger, a check valve housed within an end of the plunger, and a longitudinal pathway extending in the plunger from the check valve toward an opposite end of the plunger unit.

* * * * *